US012776952B2

(12) United States Patent
Idnani et al.

(10) Patent No.: US 12,776,952 B2
(45) Date of Patent: *Oct. 27, 2026

(54) SYSTEM, APPARATUS, AND MEDIA FOR CHANGING STATE OF AN INTERNET OF THINGS (IOT) DEVICE

(71) Applicant: Transform SR Brands LLC, Hoffman Estates, IL (US)

(72) Inventors: Ajaykumar R. Idnani, Hoffman Estates, IL (US); Jonathan Meeks, Evanston, IL (US); Angel Favila, Lake In The Hills, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 40 days.

This patent is subject to a terminal disclaimer.

(21) Appl. No.: 19/064,019

(22) Filed: Feb. 26, 2025

(65) Prior Publication Data

US 2025/0293923 A1 Sep. 18, 2025

Related U.S. Application Data

(63) Continuation of application No. 18/495,316, filed on Oct. 26, 2023, now Pat. No. 12,255,777, which is a continuation of application No. 18/095,600, filed on Jan. 11, 2023, now Pat. No. 11,811,602, which is a continuation of application No. 17/722,619, filed on Apr. 18, 2022, now Pat. No. 11,588,691, which is a continuation of application No. 16/207,429, filed on Dec. 3, 2018, now Pat. No. 11,310,109, which is a (Continued)

(51) Int. Cl.
*H04L 41/0816* (2022.01)

(52) U.S. Cl.
CPC ................................ *H04L 41/0816* (2013.01)

(58) Field of Classification Search
CPC .................................................. H04L 41/0816
See application file for complete search history.

(56) References Cited

U.S. PATENT DOCUMENTS 7,526,539 B1 * 4/2009 Hsu .................... H04L 12/2818 709/224
2013/0052946 A1 * 2/2013 Chatterjee .............. H04W 4/80 455/41.1

(Continued)

OTHER PUBLICATIONS

"Cheat Sheet: The Internet of Things (IOT)", http://futurethinking.ee.co.uk/, Jan. 29, 2015 (5 pages).

(Continued)

*Primary Examiner* — Suraj M Joshi
(74) *Attorney, Agent, or Firm* — McAndrews Held & Malloy, Ltd.

(57) ABSTRACT

Systems, methods, and apparatus are disclosed that process requested changes to operating parameters of an Internet of Things (IoT) device. In some embodiments, a client computing device originates a requested change to the IoT device. An IoT services system may process the requested change and determine whether an early indication of success is appropriate. If an early indication of success is appropriate, the IoT services system, prior to the requested change being applied to the IoT device, transmits to the client computing device a first message that provides an indication of success for the requested change.

14 Claims, 10 Drawing Sheets

Related U.S. Application Data continuation of application No. 14/620,311, filed on Feb. 12, 2015, now Pat. No. 10,148,502.

(56) References Cited

U.S. PATENT DOCUMENTS

| | | | | |
|---|---|---|---|---|
| 2014/0253301 | A1 | 9/2014 | Hirayama et al. | |
| 2015/0134761 | A1* | 5/2015 | Sharma ................... | H04L 67/55 709/204 |
| 2015/0319006 | A1* | 11/2015 | Plummer ............ | H04L 12/2809 700/83 |

OTHER PUBLICATIONS

"Machine-to-Machine (M2M) and the Internet of Things (IOT)—Ready For Business", http://futurethinking.ee.co.uk, Jan. 29, 2015 (6 pages).
"What is Machine to Machien (M2M) Communication in IoT?", https://thecustomizewindows.com/2014, Jan. 29, 2015 (8 pages).

* cited by examiner

SYSTEM, APPARATUS, AND MEDIA FOR CHANGING STATE OF AN INTERNET OF THINGS (IOT) DEVICE

The present application is a continuation of U.S. application Ser. No. 18/495,316 filed Oct. 26, 2023, which is a continuation of U.S. application Ser. No. 18/095,600 filed Jan. 11, 2023, now U.S. Pat. No. 11,811,602, which is a continuation of U.S. application Ser. No. 17/722,619, filed on Apr. 18, 2022, now U.S. Pat. No. 11,588,691, which is a continuation of U.S. application Ser. No. 16/207,429, filed Dec. 3, 2018, now U.S. Pat. No. 11,310,109, which is a continuation of U.S. application Ser. No. 14/620,311, filed Feb. 12, 2015, now U.S. Pat. No. 10,148,502. Each of the above-referenced applications is hereby incorporated herein by reference in its entirety.

FIELD OF THE DISCLOSURE

The present disclosure relates generally to configuring and/or updating a network-enabled device. More specifically, the present disclosure relates to systems, methods, and media for updating or changing state of an Internet of Things (IoT) device via a network.

BACKGROUND

The Internet of Things (IoT) generally refers to the concept of providing network connectivity and, in particular, Internet connectivity to a wide array of different devices of which many have historically lacked network connectivity. Many automation and monitoring improvements are expected to develop as a result of network connectivity being provided to this wide array of different devices. Besides automation, the Internet of Things is also expected to provide new data mining opportunities that may help improve existing systems and processes.

BRIEF SUMMARY OF THE DISCLOSURE

Shown in and/or described in connection with at least one of the figures, and set forth more completely in the claims are systems, methods, and computer readable medium that update a state of an IoT device in a manner that improves user's perception of the overall performance of the IoT system.

These and other advantages, aspects and novel features of the present disclosure, as well as details of illustrated embodiments thereof, will be more fully understood from the following description and drawings.

DETAILED DESCRIPTION

In one embodiment of the disclosure, an IoT system may provide a user or client the ability to remotely configure and change operating parameters of a IoT device via a client application running on a client computing device such as a smart phone, tablet, laptop, etc. For example, a client application may permit a user to remotely adjust the temperature of the thermostat for the user's heating and/or cooling system while the user is away from home.

While IoT systems provide various benefits such as described above, IoT systems may also possess various shortcomings. For example, users may perceive IoT systems to be non-responsive or slow. IoT systems generally include multiple layers between a client application and the IoT device that a user intends to interact or otherwise access with the client application. These additional layers as well as other things may introduce latency that a user perceives as poor responsiveness to their requests or as simply a system that performs slowly.

Some disclosed embodiments are directed to interacting with an Internet of Things (IoT) device via a network in a manner that reduces latency from the user's perspective. More specifically, some disclosed embodiments confirm a change request message initiated by a client application prior to the requested change being applied to the IoT device. Such an early confirmation may improve a user's perception of the overall responsiveness of the IoT system. Various embodiments are described in the context of a user changing one or more operating parameters of a home appliance in the user's home. However, some aspects of the disclosed embodiments may also apply to other IoT environments. For example, some aspects of the disclosed embodiments may apply to industrial, medical, scientific embodiments in which operating parameters of industrial equipment, medical equipment, and/or deployed sensors are changed via a network and a client application.

Figure 1:
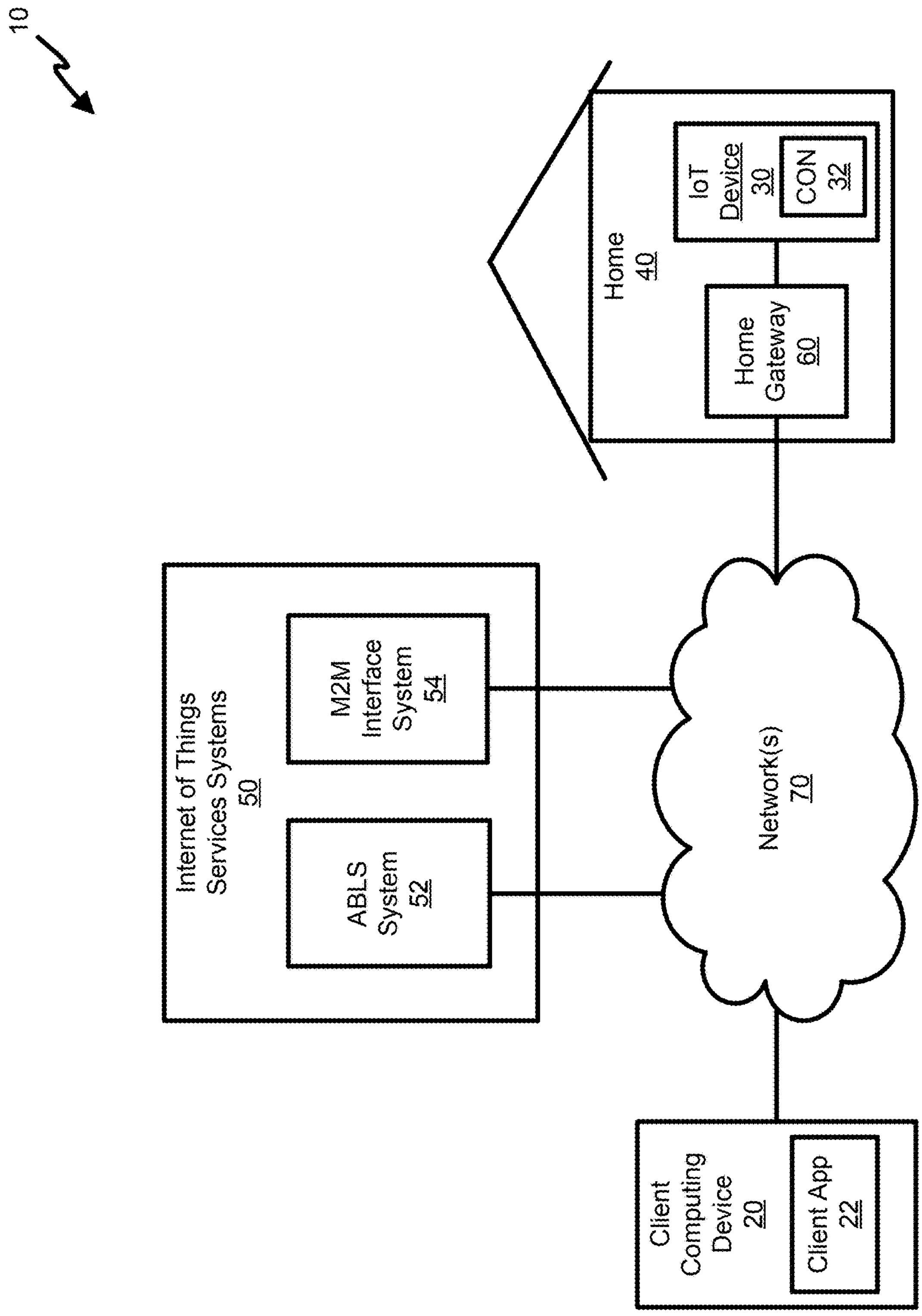
FIG. 1 shows an Internet of Things (IoT) system in accordance with an example embodiment of the present disclosure.

Referring to FIG. 1, an Internet of Things (IoT) system 10 is depicted that facilitates changing one or more operating parameters of an IoT device. As shown, the IoT system 10 may include a user's client computing device 20 and an IoT device 30 in a user's home 40. The IoT system 10 may further include IoT services systems 50 and a home gateway device 60 which are coupled to the client computing device 20 via a network 70.

The network 70 may include a number of private and/or public networks that collectively provide one or more communication paths that interconnect the client computing device 20, the IoT services systems 50, and gateway device 60. For example, the network 40 may include wireless and/or wired network, LAN (local area network) networks, WAN (wide area network) networks, PAN (personal area network) networks, cellular networks, and/or the Internet.

The client computing device 20 may include computing devices that enable a user to communicate with the IoT device 30, the IoT services systems 50, and/or gateway device 60 via the network 70. For example, the client computing device 20 may be implemented as a smart phone, a tablet computing device, a laptop computing device, a desktop computing device, gaming console, wearable computing device, and/or some other computing device.

The client computing device 20 may further include a client application 22 that is executed by the client computing device 20 to enable communication with the IoT device 30, the IoT services systems 50, and/or gateway device 60 via the network 70. To this end, the client application 22 may include an application native to the client platform that has been especially designed to provide the client computing device 20 with access to the IoT device 30, the IoT services systems 50, and/or the gateway device 60. For example, if the client computing device 20 is an iPhone™, iPad™, Apple™ Watch™ or some other iOS™ device, then the client application 22 may be a native iOS™ application that has been downloaded and installed from the App Store. Similarly, if the client computing device 20 is a Windows™ computing device, the client application 22 may be a native Windows™ application.

In other embodiments, the client application 22 may not be an application that is native or otherwise specifically designed for the respective computing platform. Instead, the client application 22 may be implemented as a Web application in which various Web and/or Internet technologies, such as Hyper-Text Markup Language (HTML) pages, Javascript, etc., configure a web browser of the client computing device 20 to provide the client computing device 20 with access to the IoT device 30, the IoT services systems 50, and/or the gateway device 60.

As shown in FIG. 1, the IoT system 10 may include an IoT device 30 connected to network 70 via gateway device 60. FIG. 1 depicts a single IoT device 30 connected to network 70 via a single gateway device 60 of home 40. However, the home 40, in some embodiments, may include multiple IoT devices 30 that are coupled to the network 70 via the single gateway device 60. Moreover, in some embodiments, the home 40 may include multiple gateway devices 60. For example, the home 40 may include a first gateway device 60 that services a first type of IoT devices (e.g., smart lighting fixtures) and a second gateway device 60 that services large household appliances (e.g., dishwashers, refrigerators, freezers, washers, dryers, etc.).

While the IoT devices 30 may encompass a wide range of different devices, each of the IoT devices 30 includes an IoT controller 32 comprising a processor, memory, and a network interface, as well as firmware and/or software instructions that, when executed by the IoT controller 32, provides the IoT device 30 with network connectivity and access to various IoT services. In particular, the IoT controller 32, in one embodiment, provides functionality that permits the client application 22 to monitor operation of the IoT device 30 and/or initiate a change to operating parameters of the IoT device 30.

The IoT services systems 50 may include one or more web servers, database servers, routers, load balancers, and/or other computing and/or networking devices. In particular, the IoT services systems 50 may include an application business logic services (ABLS) system 52 and a machine-to-machine (M2M) interface 54. The ABLS system 52 generally interacts with the client computing device 20 via client application 22 in order to provide the client computing device 20 with various IoT management and/or monitoring capabilities. In particular, the ABLS system 52 may receive and process change request messages received from the client application 22 and client computing device 20. Such processing may include authenticating the change request message to determine that the request was received from a user, client application 22, and/or client computing device 20 authorized to make the requested change to the respective IoT device 30. Such processing may further include forwarding the request to the M2M interface system 54 if the request is authorized.

The M2M interface system 54 generally provides an interface between the ABLS system 52 and the IoT device 30 and/or gateway device 60. To this end, the M2M interface system 54 may receive requests from the ABLS system 52 via a first protocol and transmit such requests to the IoT device 30 via a second protocol suitable for the IoT device 30. Similarly, the M2M interface system 54 may receive responses from the IoT device 30 via the second protocol and transmit such responses to the ABLS system 52 via the first protocol.

By implementing the IoT services systems 50 in a tiered manner, the ABLS system 52 may provide the client applications 22 with a consistent interface that is independent of the protocols used to communicate with the gateway device 60 and/or IoT device 30. Similarly, the M2M interface system 54 may provide the ABLS system 52 with a consistent interface that is independent of the protocols used to communicate with the gateway device 60 and/or IoT device 30. In this manner, implementation details specific to a particular type or class of IoT device may be localized in the M2M interface system 54 making it easier to add support for additional types of IoT devices.

As shown in FIG. 1, the IoT system 10 may further include a gateway device 60 that may perform a similar role as the M2M interface system 54. In particular, the gateway device 60 may communicate with the M2M interface system 54 using a particular protocol, but may communicate with one or more IoT devices 30 using a different protocol. Thus, the gateway device 60 may receive requests from the M2M interface system 54 using a protocol common to both the gateway device 60 and the M2M interface system 54, and may transmit a received request to a IoT device 30 using a different protocol that is common to both the gateway device 60 and the IoT device 30. In this manner, the gateway device 60 may provide the M2M interface system 54 with a consistent interface for accessing the IoT devices 30 that are behind the gateway device 60.

Besides providing protocol translation, the gateway device 60 may also provide isolation. In particular, the gateway device 60 may block or otherwise prevent the relay of certain types of requests to the IoT device 30 and similarly may block or otherwise prevent the relay of certain types of responses from the IoT device 30. In this manner, the gateway device 60 may help protect the IoT devices 30 from attacks and may help prevent the IoT devices 30 from disclosing data to unauthorized users.

As explained above, the IoT system 10 may include the ABLS system 52, the M2M interface system 54, and the gateway device 60. However, in some embodiments, one or more of these layers may be omitted. For example, some embodiments may omit the gateway device 60. In such an embodiment, the M2M interface system 54 may communicate directly with an IoT device 30 instead of via a gateway device 60. Similarly, in some embodiments, the M2M interface system 54 may be omitted and the ABLS system 52 may communicate directly with the gateway device 60 and/or the IoT device 30. In yet other embodiments, the IoT services systems 50 may be omitted and the client application 22 may communicate directly with the gateway device 60 and/or the IoT device 30.

Regardless of the number of tiers in a particular embodiment, a request to change one or more operating parameters of an IoT device 30 may take longer than desired in order to provide the user with the perception of a well-performing and/or responsive IoT system 10. In an attempt to address such latency issues with respect to change request messages, the IoT system 10 may utilize various approaches as explained below that reduce the latency of such requests from the user's perspective.

While FIG. 1 depicts an example embodiment of an IoT system 10, the IoT system 10 may be implemented in numerous different manners using a wide range of different computing devices, platforms, networks, IoT devices, etc. Moreover, aspects of the IoT system 10 may be implemented using a client/server architecture, a peer-to-peer (P2P) architecture, and/or another networking architecture. Such embodiments are envisioned and protection for such embodiments is sought to the extent encompassed by the appended claims.

Figure 2:
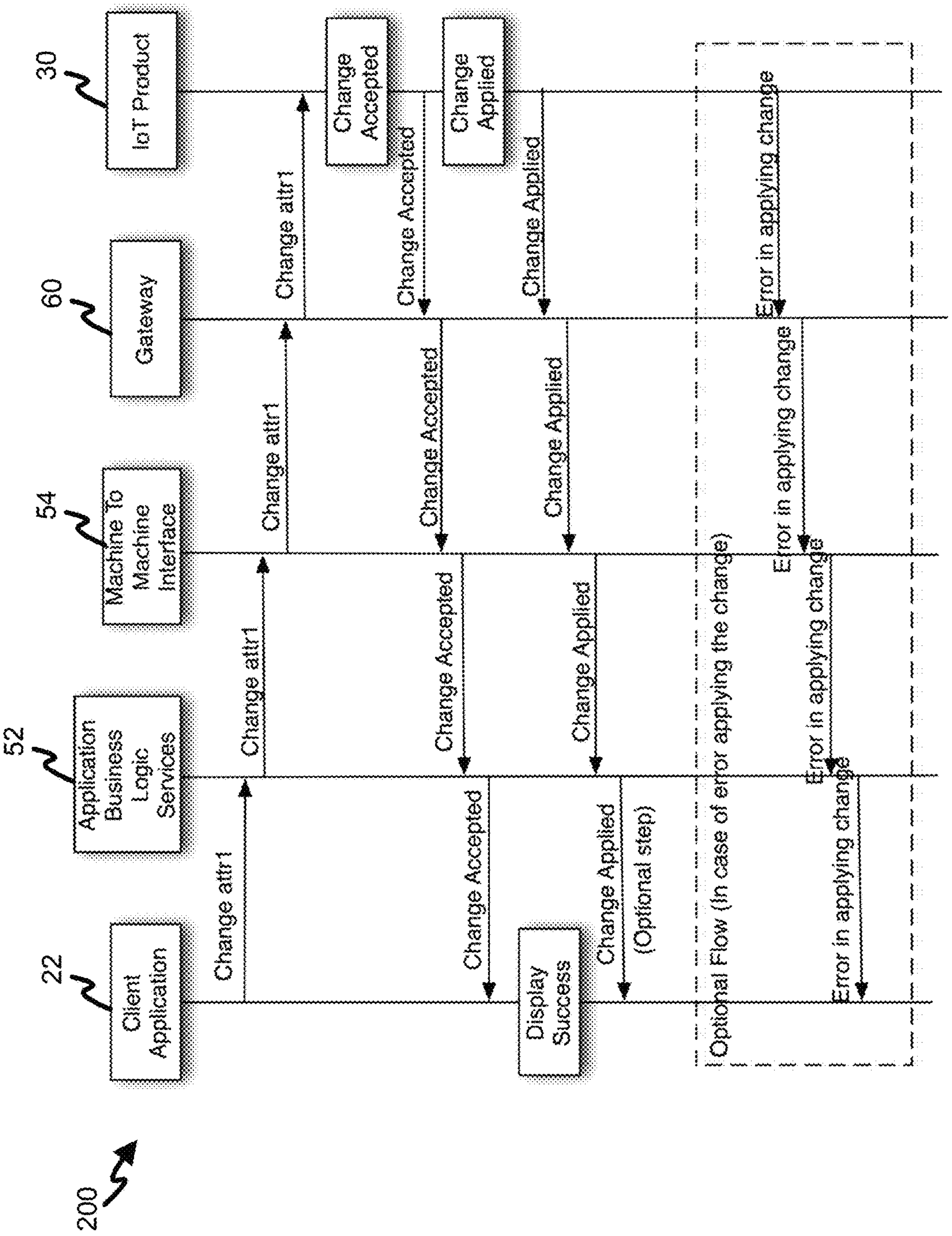
FIG. 2 shows a message flow diagram that depicts an example message flow resulting from processing a change request by the IoT system of FIG. 1.

Referring now to FIG. 2, a message flow diagram is depicted. In general, FIG. 2 depicts a message flow for an embodiment in which an early indication of success is generated and transmitted to the client computing device 20 that originated the requested change to an operating parameter of an IoT device 30. In particular, the early indication of success is initiated before the requested change is in fact applied the IoT device 30. In many environments, the probability of the IoT device 30 successfully applying the change is fairly high. As such, the client computing device 20, in response to receiving the early indication of success, may present an indication to the user that the change was successful with little risk of the presented indication ultimately being incorrect. In this manner, the client computing device 20 may improve the user's perception of the IoT system 10 since the user is likely to generally experience ultimately-accurate, early indications of success with very few if any subsequent error messages with respect to a request that ultimately failed after such an early indication.

For purposes of illustration, FIG. 2 is described from the standpoint of client application 22 initiating a change to an operating parameter or attribute of an IoT device 30 that, for example, comprises a thermostat for a heating and/or cooling system of the home 40. A user, during the winter months, may manually set the thermostat to a lower temperature (e.g., 58° F.) as he leaves for work in the morning. When he leaves work, he may wish to remotely increase the temperature setting of the thermostat back to a more comfortable level (e.g., 70° F.) so that his home 40 is at or near the desired temperature by the time he arrives.

To this end, the user may use his client computing device 20 (e.g., smart phone) and client application 22 to initiate a change to the temperature setting of the thermostat. As a result of the user initiating such a change, the client application 22 may generate a change request message suitable for the ABLS system 52 and transmit the generated change request message to the ABLS system 52. The ABLS system 52 may process the received change request message, generate a change request message suitable for the M2M interface system 54, and transmit the generated change request message to the M2M interface system 54. The M2M interface system 54, likewise, may process the received change request message, generate a change request message suitable for the gateway device 60, and transmit the change request message to the gateway device 60. Similarly, the gateway device 60 may process the received change request message, generate a change request message suitable for the IoT device 30, and transmit the change request message to the IoT device 30 that includes the thermostat for the heating and/or cooling system of the home 40.

The IoT controller 32 of the IoT device 30 may receive the change request message and initiating transmission of a change accepted message back to the client application 22 prior to initiating and/or completing a requested change to the temperature setting of the thermostat. As shown, the transmitted change accepted message is propagated back to the client application 22 through the gateway device 60, the M2M interface system 54, and the ABLS system 52 in a manner similar to the change request message. Upon receiving the change accepted message, the client application 22 via a user interface of the client computing device 20 may provide the user with an indication that the requested change to the temperature setting of the thermostat was successful. For example, the client application 22 may display an appropriate message on a display screen of the client computing device 20, may playback an appropriate voice response through an audio speaker of the client computing device 20, and/or provide the user with some other form of confirmation via the user interface.

As further illustrated in FIG. 2, the IoT device 30 may apply the change to the temperature setting while the change accepted message is propagating back to the client application 22. In some embodiments, IoT device 30 may further generate a change applied message and initiate transmission of the generated change applied message back to the client application 22 via the various layers of the IoT system 30 after the change to the operating parameter has been successfully applied. In some embodiments, the client application 22 may take further action based on receipt or non-receipt of the change applied message from the IoT device 30. For example, the client application 22 may cause the client computing device 10 to present an appropriate confirmation message upon receipt of the change applied message. Alternatively, or in additionally, the client application 22 may cause the client computing device 10 to present an appropriate error message if the change applied message is not received after a specified timeout period.

As further depicted in FIG. 2, the IoT device 30 may further generate an error message and transmit such error message back to the client application 22 via the various layers of the IoT system 30 if the IoT device 30 encounters some error while attempting to effectuate the request change and was therefore unable to successful apply the requested change. In some embodiments, the client application 22 may take further action based on receipt of an error applied message from the IoT device 30. For example, the client application 22 may cause the client computing device 10 to present an appropriate error message upon receipt of the error message. Alternatively, or in additionally, the client application 22 may cause the client computing device 10 to present options for addressing received error message such as, for example, providing the user the option of retrying the previous change request.

Due to providing early responses to the initiated change requests in the manner presented in FIG. 2, the IoT system 10 may improve the user's perception of the overall responsiveness of IoT system 10 when compared to an IoT system that does not provide such an early response prior to successfully applying the requested change. For some IoT devices 30 and/or some types of requested changes, the IoT device 30 may take a considerable amount of time (e.g., greater than 30 seconds) to effectuate the requested change. By returning a change accepted message prior to applying and/or completing the requested change, the IoT device 30 may reduce the time between when the client application 22 initiated the change request and when the client application 22 provides the user with an indication that the change was successful. Thus, from the user's perspective, the IoT system 10 appears to be more responsive than other IoT systems that do not provide such change accepted messages.

FIG. 2 depicts a message flow of a particular embodiment in which the IoT device 30 provided an early indication of success. Moreover, FIG. 2 depicts one manner that the IoT device 30 may handle a change applied message received after the requested change has been successfully applied and/or an error message received after an error has occurred. However, in some embodiments, such functionality of the IoT device 30 may be moved even further upstream in order to provide the client device 20 with even earlier indications of success and thus further improve the user's perception of the responsiveness.

Figure 3:
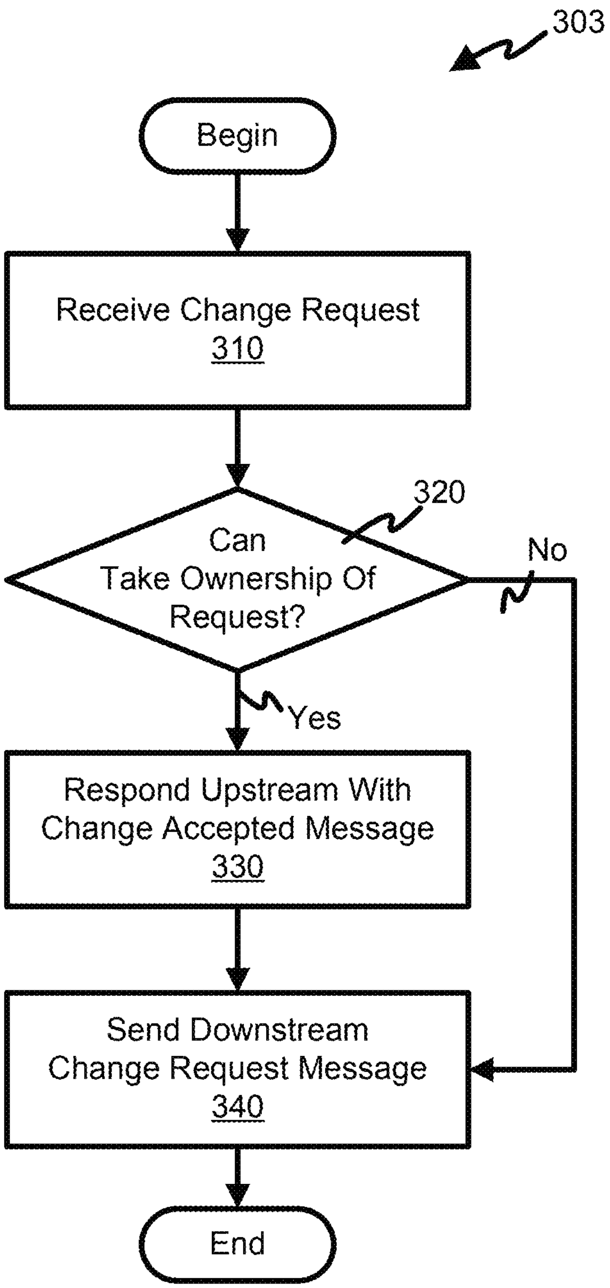
FIGS. 3-9 show various example methods that may be used by the IoT system of FIG. 1 to process change requests and present a user with an earlier indication of success.

To this end, reference is now made to FIG. 3 which depicts a method 303 which may be executed by a component of one of the IoT layers, e.g., ABSL system 52, M2M interface system 54, and/or gateway device 60 in order to provide early indications of success. As shown, at 310, a receiving component such as, for example, the ABSL system 52, M2M interface system 54, or gateway device 60 may receive a change request message from an upstream component. At 320, the receiving component may determine whether it can take ownership of ensuring that the change request message is successfully communicated to the IoT device 30. If the receiving component determines that it can take ownership, then the receiving component at 320 may generate a change accepted message and transmit the generated change accepted message to an upstream component in order to propagate the generated change accepted message back to the client application 22 that initiated the change request.

In general, the receiving component may take ownership if the receiving component has the ability via software, firmware, and/or hardware to determine whether the change request message was received and successfully applied to the IoT device 30 and to take corrective and/or otherwise appropriate action if the change request message was not successfully received and applied by the IoT device 30. For example, the IoT device 30 may transmit a change applied request message upstream if the change is successfully applied as shown in FIG. 2. Moreover, as shown in FIG. 2, the IoT device 30 may transmit upstream an error message if the IoT device 30 was unable to make the requested change. Based on such messages and/or timeout periods, the receiving component may ascertain whether the change request message was received and/or successfully applied by the IoT device 30. If not, then the receiving component may take appropriate action. For example, the receiving component may retransmit the change request message downstream to the IoT device 30 with the hope that the error was merely intermittent and another attempt will succeed. The receiving component may also transmit an appropriate message upstream to the client application 22 that informs the client application 22 that the requested change failed.

Figure 4:
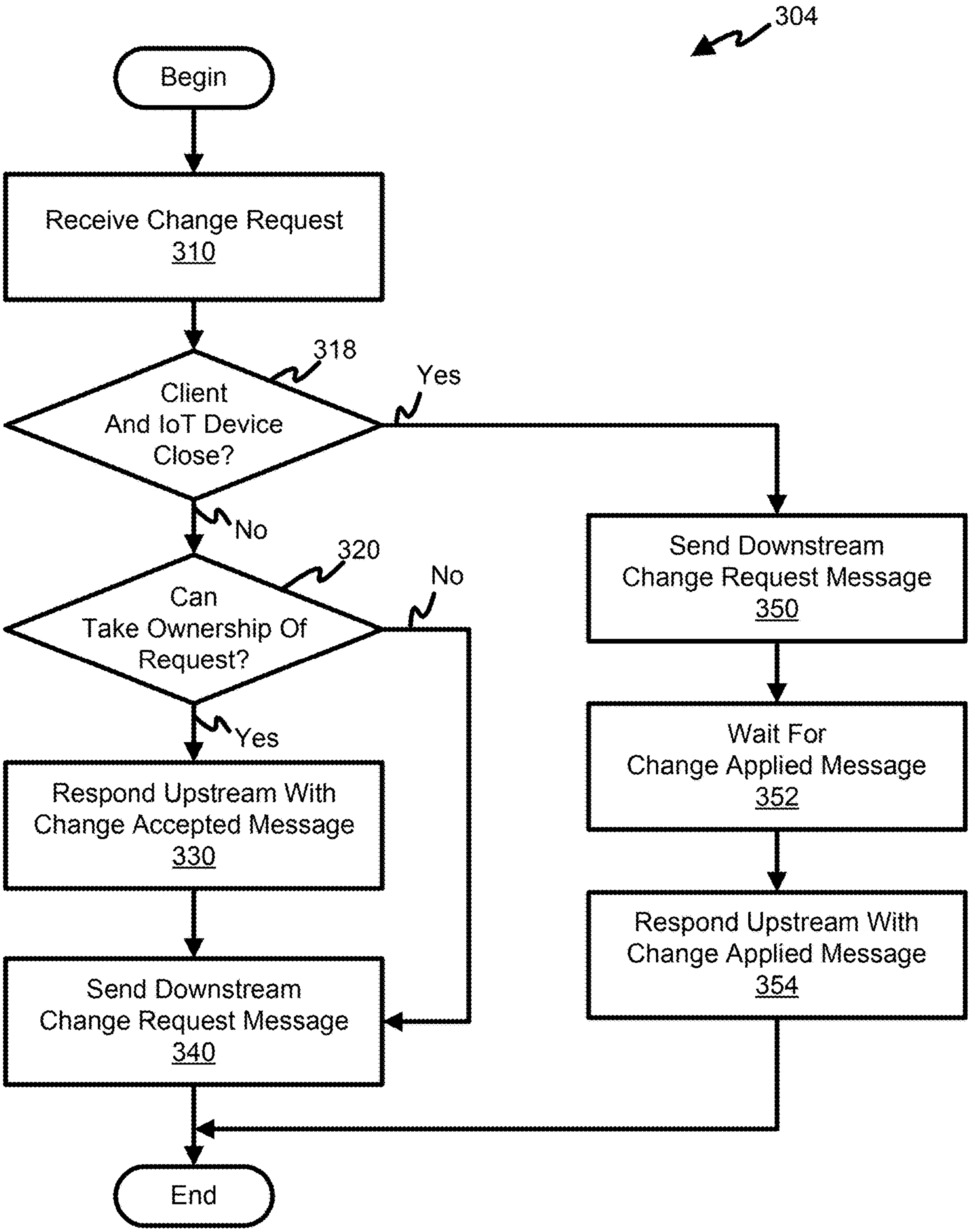

Referring now to FIG. 4, another method 304 which may be executed by a component of one of the IoT layers, e.g., IoT device 30, ABSL system 52, M2M interface system 54, and/or gateway device 60 in order to provide early indications of success is depicted. In general, the method 304 generally accounts for proximity of the client computing device 20 to the IoT device 30. In particular, if the user is physically close to the IoT device 30 when a change request is initiated via the client computing device 20, then the user may be in position to personally observe changes made to the IoT device 30. Early indications of success in such a situation may provide the user with the perception that the IoT system 10 is malfunctioning since the user may receive indications of success while at the same time observe that the requested changes have not, in fact, been made to the IoT device 30.

The method 304 operates in a manner similar to method 303 depicted in FIG. 3, but provides an enhancement in which proximity of the client computing device 20 is further taken into consideration before providing a confirmation of the change to the user. As such, aspects of method 304 that may be implemented in a manner similar to aspects of method 303 are provided with the same references numeral in FIG. 4 as those shown in FIG. 3 and are not generally further described below.

As noted, the method 304 causes the receiving component to further take into consideration proximity of the IoT device 30. In particular, if the receiving component determines at 318 that client computing device 20 is in close proximity of the IoT device 30, the receiving component may wait for the requested change to be successfully applied to the IoT device 30 before providing the user with an indication of success. The receiving component may be able to infer or otherwise determine whether the client computing device 20 is in close proximity to the IoT device 30 using a number of different techniques. For example, the receiving component may determine that the client computing device 20 and the IoT device 30 are in close proximity if client computing device 20 and the IoT device 30 are connected to the same wireless network or IP subnet. The receiving component may also make such determination based on location tracking of the client computing device 20 and the IoT device 30. For example, location of the client computing device 20 and/or the IoT device 30 may be determined via GPS coordinates, cellular network triangulation, WiFi network triangulation, and/or other real-time location tracking techniques. Moreover, the IoT device 30 may be a stationary or generally stationary device (e.g., kitchen appliance, thermostat, etc.). In such a situation, the IoT system 10 may be provided with location information for the IoT device 30 such as, for example, the address of the home 40 in which the IoT device 30 resides.

If the receiving component 318 determines that the client computing device 20 is in close proximity to the IoT device 30, then the receiving component at 350 may transmit the change request downstream to the IoT device 30 via the remaining layers of the IoT system 10. At 352, the receiving component may wait for a change accepted message and a change applied message. Alternatively, the receiving component at 352 may wait for only the change applied message. The change accepted message in such an embodiment may not be generated or may simply be ignored by the receiving component. After receiving the change applied message, the receiving component at 354 may transmit a change applied message upstream to the client computing device 20.

Conversely, if the receiving component determines at 318 that the client computing device 20 is not in close proximity of the IoT device 30, then the receiving component may proceed to 320 to determine whether it can take ownership of the change request. If the receiving component 318 can, then the receiving component may transmit a change accepted message upstream to the client computing device 20 at 330 in a manner as described above in regard to method 303 and FIG. 3. In this manner, the receiving component may continue to provide early change accepted messages when the user is not in close proximity to the IoT device 30 and thus improve the user's perception of system responsiveness. Moreover, the receiving component may withhold such early change accepted messages when the user is in close proximity to the IoT device 30 and may be confused by the received message that does not appear to coincide with their direct observation of the IoT device 30.

Figure 5:
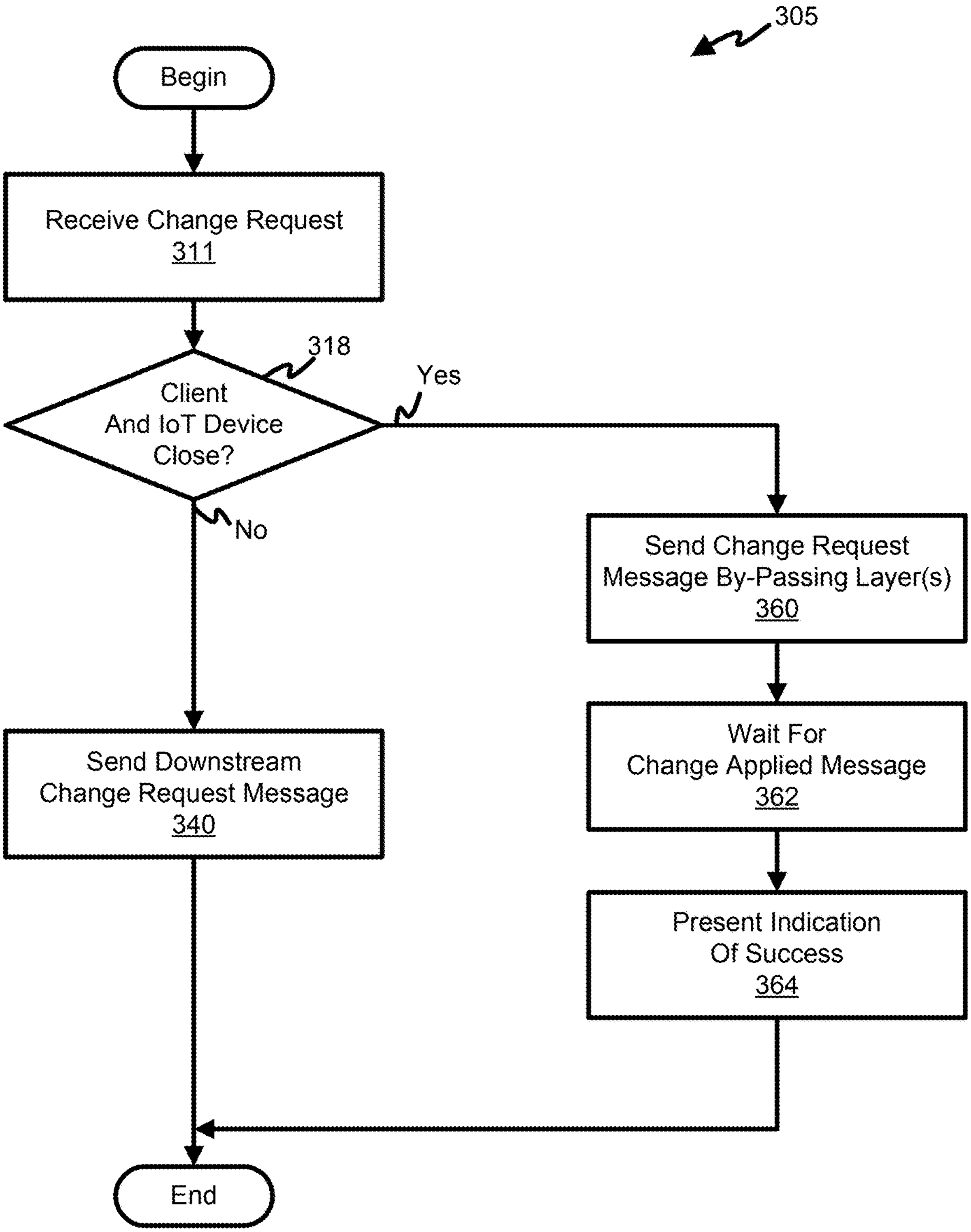

Referring now to FIG. 5, yet another method 305 which may be executed by the client computing device 20 in order to provide early indications of success is depicted. In general, the method 305, like the method 304, generally accounts for proximity of the client computing device 20 to the IoT device 30. As such, the method 305 operates in a manner similar to method 304 depicted in FIG. 4, but provides an enhancement in which the client computing device 20 communicates either directly with the IoT device 30 or communicates with the IoT device 30 via home gateway 40. As shown, the client computing device 20 and client application 22 at 311 receive a request to change an operating parameter of the IoT device 30 via a user interface of the client computing device 20.

At 318, the client computing device 20 may determine whether the client computing device 20 is in close proximity to the IoT device 30. If the client computing device 20 is not in close proximity to the IoT device 30, then the client computing device at 340 may generate a change request message and transmit the change request message downstream to a receiving component such as the IoT services systems 50 for further processing. However, if the client computing device 20 is in close proximity to the IoT device 30, then the client computing device at 360 may directly transmit the change request message to the IoT device 30 or may transmit the change request message to the IoT device via the home gateway device 60, thus by-passing one or more layers (e.g., ABSL system 52, M2M interface system 54, and/or gateway device 60) of the IoT system 30. Bypassing such layers may reduce the latency of the request and thus improve the user's perception of IoT system 10.

At 362, the client computing device 20 and client application 22 may wait for a change accepted message and a change applied message. Alternatively, the client computing device and client application 22 may wait for only the change applied message. The change accepted message in such an embodiment may not be generated or may simply be ignored by the receiving component. After receiving the change applied message, the client computing device 20 and client application 22 may present the user with a confirmation message that indicates that the requested change was successfully applied.

Figure 6:
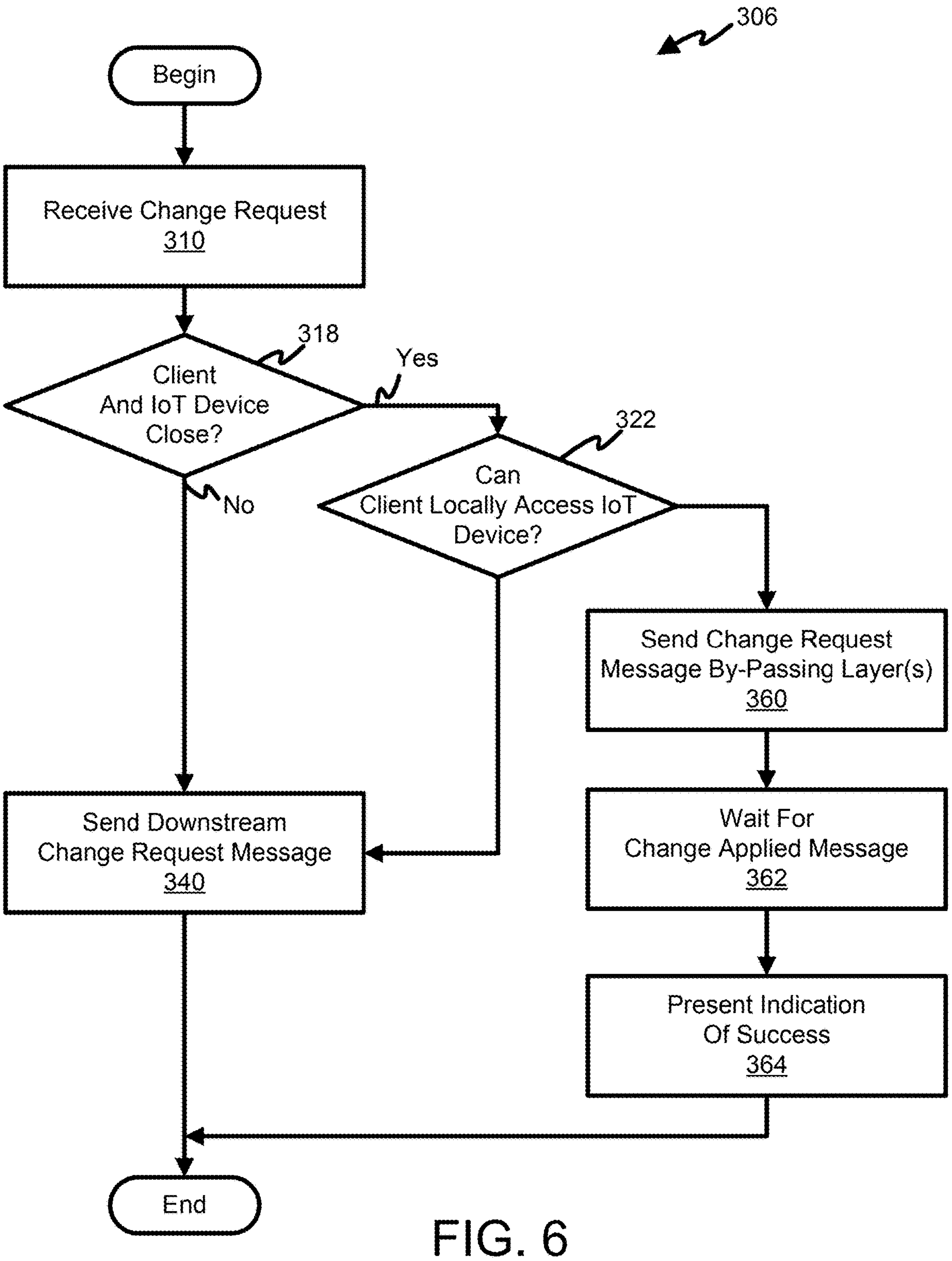

Referring now to FIG. 6, a further method 306 which may be executed by the client computing device 20 in order to provide early indications of success is depicted. In general, the method 306 provides an enhancement to the method 305 shown in FIG. 5. In particular, method 306 further accounts for situations in which, despite being proximate to the IoT device 30, the client computing device 20 is unable to communicate with the IoT device 30 directly and/or via the home gateway 60 without using the IoT services systems 50. As such, many aspects of the method 306 may be implemented in a manner similar to corresponding aspects of method 305 described above. Accordingly, such aspects are generally not described below, but instead FIG. 6 depicts such aspects with the same reference numerals as corresponding aspects of method 305 and FIG. 5.

As shown, the client computing device 20 and client application 22 at 322 may further determine whether the client computing device 20 is able to locally access the IoT device 30 without utilizing the IoT services systems 50. For example, the client application 22 may be programmed with configuration details for various IoT devices and home gateways that client application 22 supports. Based on such details, the client computing device 20 and/or client application 22 may be able to ascertain whether the client computing device 20 shares a common communications technology such as, for example, WiFi, Bluetooth, cellular (e.g., GSM, CDMA, 3G, 4G, WiMAX, LTE), etc. with the IoT device 30 and/or gateway 60 and therefore whether direct communication and local control is supported. The client computing device 20 and/or client application 22 may further make such determinations based on whether prior attempts to directly communicate with the IoT device 30 and/or home gateway 60 and/or whether prior attempts to locally control the IoT device 30 were successful.

If the client computing device 20 and/or client application determine that client computing device 20 can locally control the IoT device 30, the client computing device proceeds to 360 in order to generate and transmit a change request message to the IoT device 30 in a manner that by-passes one or more layers of the IoT system 10. However, if local control is not supported, then the client computing device at 340 may generate a change request message and transmit the change request message downstream to a receiving component such as the IoT services systems 50 for further processing.

Figure 7:
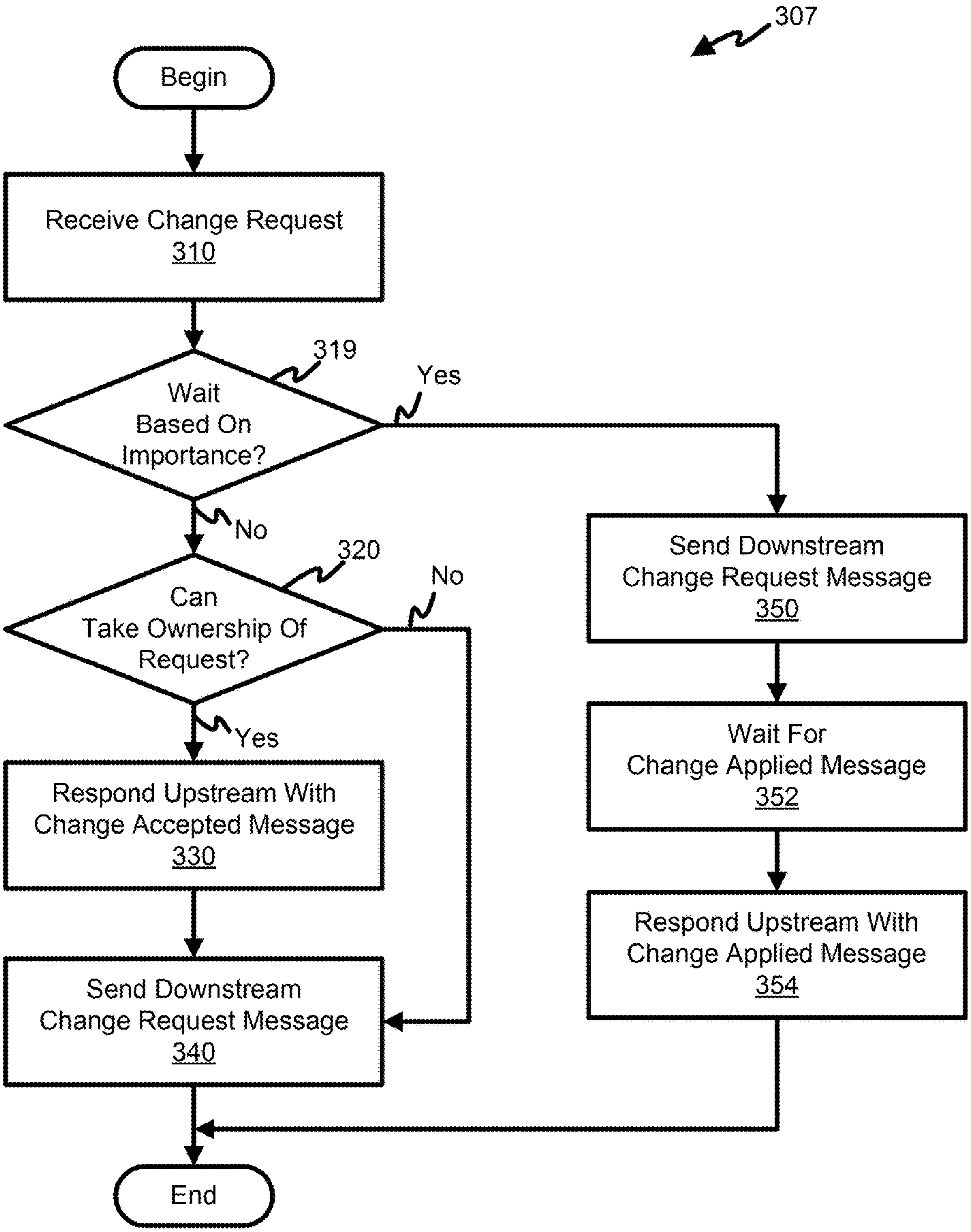

Referring now to FIG. 7, another method 307 which may be executed by a component of one of the IoT layers, e.g., ABSL system 52, M2M interface system 54, and/or gateway device 60 in order to provide early indications of success is shown. In general, the method 307 provides an enhancement to the method 303 shown in FIG. 3. In particular, method 307 further accounts for situations where IoT system 10 determines, based on an importance of the change request message, to wait for the change applied message before presenting an indication of success to the user. In certain situations, a user may be more concerned that the requested change is in fact applied than the user is concerned with responsiveness of the IoT system 20. Generally speaking, certain IoT devices are considered more import or more critical than other. For example, a user may consider a request to lock his front door more important than a request to adjust his thermostat by a few degrees. In such a situation, merely providing the user with an indication that the request to lock his front door was accepted may not satisfy the user's needs.

The method 307 attempts to address the above concern by not presenting the user with an early indication of success if the requested change is of greater importance. Many aspects of the method 307 may be implemented in a manner similar to corresponding aspects of methods 303 and 304 of FIGS. 3 and 4. Accordingly, such aspects are generally not described below. Instead, FIG. 7 depicts such aspects with the same reference numerals as corresponding aspects of FIGS. 3 and 4.

As shown, a receiving component such as, for example, ABSL system 52, M2M interface system 54, and/or gateway device 60 at 319 may determine whether to wait for an applied message based on importance of the requested change or the IoT device 30. In particular, the receiving component may ascertain whether the received change request message is of a kind in which confirmation that the change was applied is desired and/or early confirmation is inappropriate. In some embodiments, the receiving component may base such determination on a white list of change requests suitable for early confirmation. In such an embodiment, the receiving component may treat all change request messages as important unless the change request is identified or otherwise present on the white list. In this manner the receiving component may proceed to 350 and wait at 352 for a change applied message if the request is not on the white list. If the request is on the white list, then the receiving component may proceed to 320 and provide an early confirmation of success at 330.

In another embodiment, the receiving component may base its determination on a black list of IoT devices and/or change requests that are not suitable for early confirmation. In such an embodiment, the receiving component may treat all change request messages as less important unless the change request is identified or otherwise present on the black list. In this manner the receiving component may proceed to 350 and wait at 352 for a change applied message if the request is on the black list. If the request is not on the black list, then the receiving component may proceed to 320 and provide at 330 an early confirmation of success.

Figure 8:
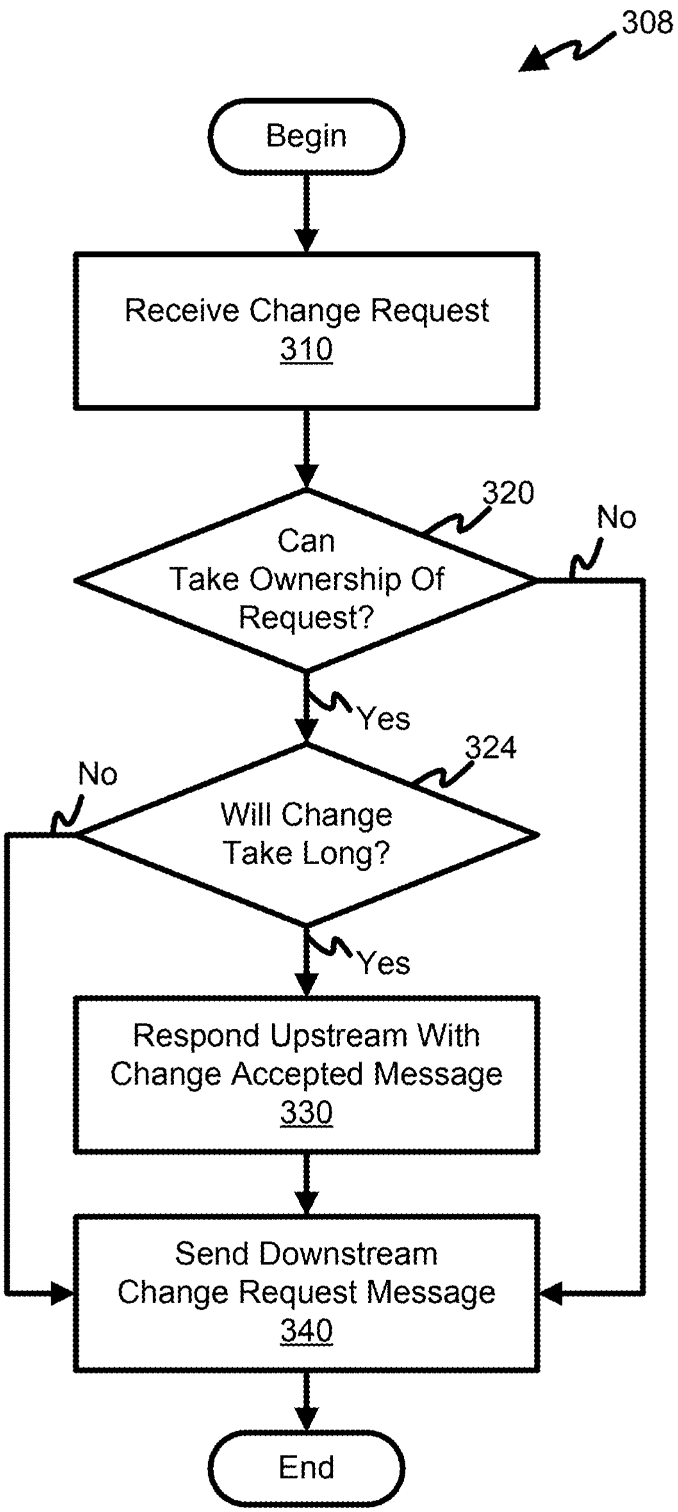

Referring now to FIG. 8, a further method 308 which may be executed by a component of one of the IoT layers, e.g., ABSL system 52, M2M interface system 54, and/or gateway device 60 in order to provide early indications of success is shown. In general, the method 308 provides an enhancement to the method 303 shown in FIG. 3. In particular, method 308 further accounts for situations where IoT system 10 determines, based on an expected length of time to apply the requested change, whether to wait for the change applied message before presenting an indication of success to the user.

Certain requests for change may take longer for an IoT device to apply than other requests for change. Similarly, certain IoT devices may take longer to apply a change than other IoT devices. For such IoT devices and/or change requests that are expected to take a relatively long time (e.g., several seconds) to apply, waiting for a change applied message may prove to be detrimental to the perceived performance of the IoT system 10. Thus, if a receiving component at 324 determines that a change request and/or the IoT device 30 is expected to take longer than a predefined and/or programmable length of time to apply the requested change, the receiving component at 330 may provide an early indication of success in order to improve user perception of performance.

The receiving component may make such a determination based on a configuration that defines which IoT devices and/or change requests early confirmation is appropriate due to the expected time for completion. In some embodiments, the receiving component may identify and/or further identify IoT devices and/or change requests that take longer than a predefined or programmable threshold amount of time based on actual observed completion times for prior requests.

Figure 9:
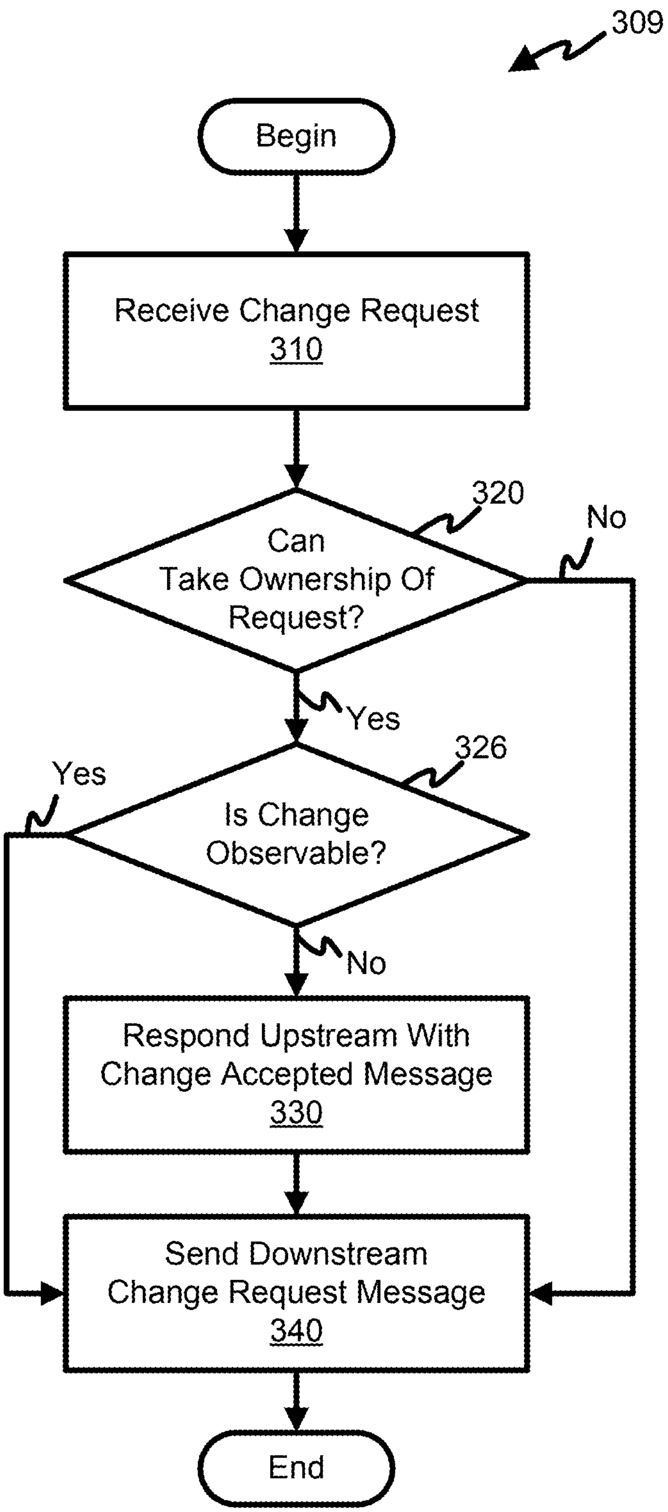

Referring now to FIG. 9, yet another method 309 which may be executed by a component of one of the IoT layers, e.g., ABSL system 52, M2M interface system 54, and/or gateway device 60 in order to provide early indications of success is shown. In general, the method 309 provides an enhancement to the method 303 shown in FIG. 3. In particular, method 309 further accounts for situations where the IoT system 10 determines, based on the observability of the requested change, whether to wait for the change applied message before presenting an indication of success to the user.

Certain attributes of an IoT device are either not observable from directly viewing the IoT device 30 or do not exhibit an immediately observable change on the IoT device 30. As explained above, in regard to FIGS. 4-6, a user may be in close proximity to the IoT device 30 and may be confused if an early confirmation of success is received that appears to contradict their direct observation of the IoT device 30. The method 309 takes advantage of the fact that such concerns are eliminated if the requested change is either hidden from direct observation or the requested change does not result an immediately visible change to the IoT device 30. Thus, if the receiving component at 326 determines that the requested change is not observable, then the receiving component at 330 provides an early indication of success.

FIGS. 2-9 as discussed above provided details regarding various techniques for providing early indications of success in order to improve a user's perception the IoT system 10. While such methods were discussed individually, various techniques described in regard to FIG. 2-9 may be mixed and matched in various combinations in order to address issues for a particular IoT environment.

Figure 10:
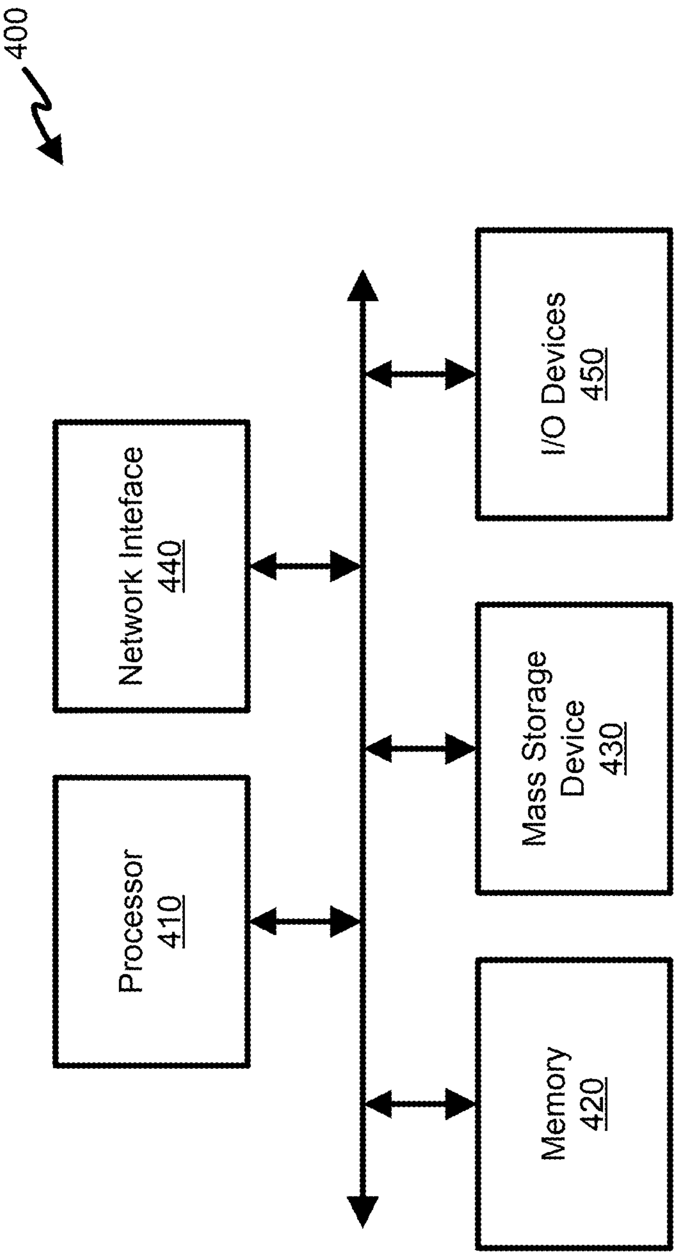
FIG. 10 shows a simplified depiction of an example computing device for use in the IoT system of FIG. 1.

In some embodiments, the client computing devices 20, IoT device 30, IoT services systems 50, and/or gateway device 60 may be implemented using various types of computing devices and/or embedded computing devices. FIG. 10 provides a simplified depiction of a computing device 400 suitable for such aspects of IoT system 10. As shown, the computing device 400 may include a processor 410, a memory 420, a mass storage device 430, a network interface 440, and various input/output (I/O) devices 450. The processor 410 may be configured to execute instructions, manipulate data and generally control operation of other components of the computing device 400 as a result of its execution. To this end, the processor 410 may include a general purpose processor such as an x86 processor or an ARM processor which are available from various vendors. However, the processor 410 may also be implemented using an application specific processor, microcontroller, and/or other circuitry.

The memory 420 may include various types of random access memory (RAM) devices, read only memory (ROM) devices, flash memory devices, and/or other types of volatile or non-volatile memory devices. In particular, such memory devices of the memory 420 may store instructions and/or data to be executed and/or otherwise accessed by the processor 410. In some embodiments, the memory 420 may be completely and/or partially integrated with the processor 410.

In general, the mass storage device 430 may store software and/or firmware instructions which may be loaded in memory 420 and executed by processor 410. The mass storage device 430 may further store various types of data which the processor 410 may access, modify, and/otherwise manipulate in response to executing instructions from memory 420. To this end, the mass storage device 430 may comprise one or more redundant array of independent disks (RAID) devices, traditional hard disk drives (HDD), sold state device (SSD) drives, flash memory devices, read only memory (ROM) devices, and/or other types of non-volatile storage devices.

The network interface 440 may enable the computing device 400 to communicate with other computing devices via network 40. To this end, the networking interface 440 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc.) or near field communication (NFC) interface, and/or some other type of networking interface capable of providing a communications link between the computing device 400 and network 40 and/or another computing device.

Finally, the I/O devices 450 may generally provide devices which enable a user to interact with the computing device 400 by either receiving information from the computing device 400 and/or providing information to the computing device 400. For example, the I/O devices 450 may include display screens, keyboards, mice, touch screens, microphones, audio speakers, digital cameras, optical scanners, RF transceivers, etc.

While the above provides some general aspects of a computing device 400, those skilled in the art readily appreciate that there may be significant variation in actual implementations of a computing device. For example, a smart phone implementation of a computing device generally uses different components and may have a different architecture than a database server implementation of a computing device. However, despite such differences, computing devices generally include processors that execute software and/or firmware instructions in order to implement various functionality. As such, the above described aspects of the computing device 400 are not presented from a limiting standpoint but from a generally illustrative standpoint. The present application envisions that aspects of the present application may find utility across a vast array of different computing devices and the intention is not to limit the scope of the present application to a specific computing device and/or computing platform beyond any such limits that may be found in the appended claims.

Various embodiments have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a tangible, computer readable storage medium such as, for example, flash memory devices, hard disk devices, compact disc media, DVD media, EEPROMs, etc. Such instructions, when executed by one or more computing devices, may result in the one or more computing devices performing various aspects of the processes depicted in FIGS. 2-9.

While the present disclosure has described certain embodiments, it will be understood by those skilled in the art that various changes may be made and equivalents may be substituted without departing from the intended scope of protection. In addition, many modifications may be made to adapt a particular situation or material to the teachings of the present disclosure without departing from its scope. Therefore, it is intended that the present disclosure not be limited to the particular embodiment or embodiments disclosed, but encompass all embodiments falling within the scope of the appended claims.

What is claimed is:

1. A method, comprising:

via an Internet of Things (IoT) device:

receiving a request for a change of an operating parameter of the IoT device;

initiating the change to the operating parameter;

determining not to transmit a message that accepts the change to the operating parameter prior to actually completing the change to the operating parameter; and transmitting a message specifying that IoT has successfully made the change to the operating parameter.

2. The method of claim 1, comprising completing the change after transmitting the message specifying that IoT has successfully made the change.

3. The method of claim 1, comprising completing the change before transmitting the message specifying that IoT has successfully made the change.

4. The method of claim 1, comprising:

detecting, with the IoT device after transmitting the message, that the IoT device failed to make the change to the operating parameter; and after detecting that the IoT device failed to make the change to the operating parameter, transmitting, from the IoT device to the network, a message that specifies the IoT device failed to make the change to the operating parameter.

5. The method of claim 1, comprising:

receiving, with the IoT device via the network, a network message that requests a second change to a second operating parameter of the IoT device;

initiating the second change to the second operating parameter as requested by the network message;

determining, with the IoT device based on an importance of the second change requested by the network message, not to transmit, prior to completing the second change to the second operating parameter, a network message that specifies the second change has been accepted; and after successfully completing the second change to the second operating parameter of the IoT device, transmitting, from the IoT device to the network, a network message specifying that IoT has successfully made the second change to the second operating parameter.

6. The method of claim 1, comprising:

receiving, with the IoT device via the network, a network message that requests a second change to a second operating parameter of the IoT device;

initiating the second change to the second operating parameter as requested by the network message;

determining, with the IoT device based on an expected time to make the second change to the second operating parameter of the IoT device, not to transmit, prior to completing the second change to the second operating parameter, a network message that specifies the second change has been accepted; and after successfully completing the second change to the second operating parameter of the IoT device, transmitting, from the IoT device to the network, a network message specifying that IoT has successfully made the second change to the second operating parameter.

7. The method of claim 1, comprising:

receiving, with the IoT device via the network, a network message that requests a second change to a second operating parameter of the IoT device;

initiating the second change to the second operating parameter as requested by the third network message;

determining, with the IoT device based on observability of the second change to the second operating parameter of the IoT device, not to transmit, prior to completing the second change to the second operating parameter, a network message that specifies the second change has been accepted; and after successfully completing the second change to the second operating parameter of the IoT device, transmitting, from the IoT device to the network, a network message specifying that IoT has successfully made the second change to the second operating parameter.

8. An Internet of Things (IoT) device, comprising:

a network interface;

a memory; and a processor configured to:

receive a request for a change of an operating parameter of the IoT device;

initiate the change to the operating parameter;

determine not to transmit a message that accepts the change to the operating parameter prior to actually completing the change to the operating parameter; and transmit a message specifying that IoT has successfully made the change to the operating parameter.

9. The system of claim 8, wherein the processor is configured to execute instructions that cause the processor to:

complete the change after transmitting the message specifying that IoT has successfully made the change.

10. The system of claim 8, wherein the processor is configured to execute instructions that cause the processor to:

complete the change before transmitting the message specifying that IoT has successfully made the change.

11. The system of claim 8, wherein the processor is configured to execute instructions that cause the processor to:

detect, with the IoT device after transmitting the message, that the IoT device failed to make the change to the operating parameter; and after detecting that the IoT device failed to make the change to the operating parameter, transmit, from the IoT device to the network, a message that specifies the IoT device failed to make the change to the operating parameter.

12. The system of claim 8, wherein the processor is configured to execute instructions that cause the processor to:

receive, with the IoT device via the network, a network message that requests a second change to a second operating parameter of the IoT device;

initiate the second change to the second operating parameter as requested by the network message;

determine, with the IoT device based on an importance of the second change requested by the network message, not to transmit, prior to completing the second change to the second operating parameter, a network message that specifies the second change has been accepted; and after successfully completing the second change to the second operating parameter of the IoT device, transmit, from the IoT device to the network, a network message specifying that IoT has successfully made the second change to the second operating parameter.

13. The system of claim 8, wherein the processor is configured to execute instructions that cause the processor to:

receive, with the IoT device via the network, a network message that requests a second change to a second operating parameter of the IoT device;

initiate the second change to the second operating parameter as requested by the network message;

determine, with the IoT device based on an expected time to make the second change to the second operating parameter of the IoT device, not to transmit, prior to completing the second change to the second operating parameter, a network message that specifies the second change has been accepted; and after successfully completing the second change to the second operating parameter of the IoT device, transmit, from the IoT device to the network, a network message specifying that IoT has successfully made the second change to the second operating parameter.

14. The system of claim 8, wherein the processor is configured to execute instructions that cause the processor to:

receive, with the IoT device via the network, a network message that requests a second change to a second operating parameter of the IoT device;

initiate the second change to the second operating parameter as requested by the third network message;

determine, with the IoT device based on observability of the second change to the second operating parameter of the IoT device, not to transmit, prior to completing the second change to the second operating parameter, a network message that specifies the second change has been accepted; and after successfully completing the second change to the second operating parameter of the IoT device, transmit, from the IoT device to the network, a network message specifying that IoT has successfully made the second change to the second operating parameter.

* * * * *